United States Patent [19]

Malachowsky

[11] Patent Number: 5,020,002

[45] Date of Patent: May 28, 1991

[54] METHOD AND APPARATUS FOR DECOMPOSING A QUADRILATERAL FIGURE FOR DISPLAY AND MANIPULATION BY A COMPUTER SYSTEM

[75] Inventor: Chris Malachowsky, Santa Clara, Calif.

[73] Assignee: Sun Microsystems, Inc., Mountain View, Calif.

[21] Appl. No.: 287,128

[22] Filed: Dec. 20, 1988

[51] Int. Cl.$^5$ .............................................. G06F 15/62
[52] U.S. Cl. ..................................... 364/518; 364/521
[58] Field of Search .................. 364/518, 521; 340/723

[56] References Cited

U.S. PATENT DOCUMENTS 4,791,582  12/1988  Ueda et al. ...................... 364/518 X Primary Examiner—Dale M. Shaw
Assistant Examiner—Mark K. Zimmerman
Attorney, Agent, or Firm—Blakely Sokoloff Taylor & Zafman

[57] ABSTRACT

A circuit for decomposing a graphic figure to be displayed by a computer output display into pairs of line segments which line segments outline the figure comprising apparatus for providing signals indicative of the vertices of a figure to be displayed, apparatus for providing comparisons of the relative positions of such vertices as they are to be displayed, apparatus for selecting a starting vertex for determining the line segments which include common scan lines, apparatus for selecting a first line segment connected to the starting vertex, apparatus for selecting a second line segment connecting to the starting vertex; and apparatus for providing output signals indicative of line segments selected.

17 Claims, 4 Drawing Sheets

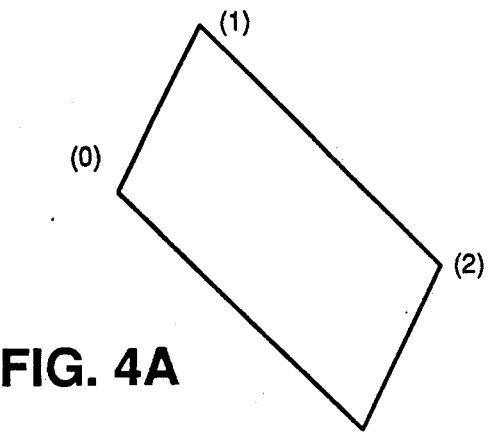
|  | 3 | 0 | 1 | 0 | 0 |
|---|---|---|---|---|---|
| # of | 2 | 1 | 0 | 0 | 0 |
| Y-coords | 1 | 0 | 0 | 1 | 0 |
| less than | 0 | 0 | 0 | 0 | 1 |
|  |  | 0 | 1 | 2 | 3 |
|  |  | vertices |
FIG. 4A
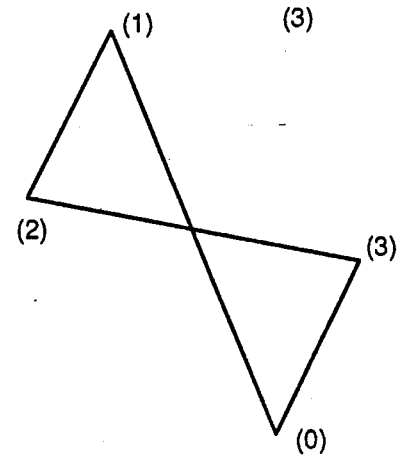
|  | 3 | 0 | 1 | 0 | 0 |
|---|---|---|---|---|---|
| # of | 2 | 0 | 0 | 1 | 0 |
| Y-coords | 1 | 0 | 0 | 0 | 1 |
| less than | 0 | 1 | 0 | 0 | 0 |
|  |  | 0 | 1 | 2 | 3 |
|  |  | vertices |
FIG. 4B
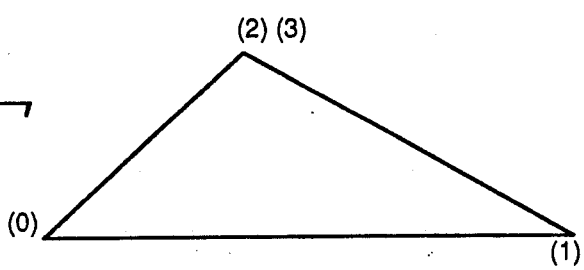
|  | 3 | 0 | 0 | 0 | 0 |
|---|---|---|---|---|---|
| # of | 2 | 0 | 0 | 1 | 1 |
| Y-coords | 1 | 0 | 0 | 0 | 0 |
| less than | 0 | 1 | 1 | 0 | 0 |
|  |  | 0 | 1 | 2 | 3 |
|  |  | vertices |
FIG. 4C
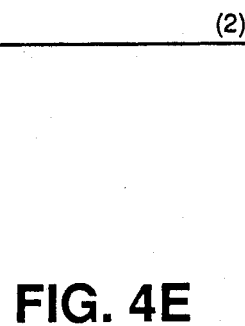
FIG. 4E
FIG. 4D

METHOD AND APPARATUS FOR DECOMPOSING A QUADRILATERAL FIGURE FOR DISPLAY AND MANIPULATION BY A COMPUTER SYSTEM

BACKGROUND OF THE INVENTION

1. Field of the Invention

This invention relates to computer systems and, more particularly, to computer systems including circuitry for decomposing graphic figures to be displayed or manipulated into portions which may be stored in a display buffer.

2. History of the Prior Art

A major problem in utilizing computers to provide graphic displays is that for a single frame of graphical material to be presented on a cathode ray tube (CRT), it is necessary to store an indication of the information which is to be displayed for each position (pixel) which is to appear at that position on the cathode ray tube. With large and detailed displays, the number of pixels on the cathode ray tube may be approximately one thousand or greater in a horizontal direction and a like number in the vertical direction giving a total of approximately one million or more pixels about which information is to be stored. In a preferred system which is capable of providing a number of different colors on the cathode ray tube, each of these pixels contains eight bits of digital information specifying the particular color output. Consequently, approximately eight million bits of information needs to be stored for each frame to be presented at the output.

Not only does color information have to be provided for each pixel for each frame of the display, but in generating graphic displays, the usual method of determining the shapes of figures requires that various algorithms be applied to the geometric vertices of those figures. If this is handled by the software of the system, computing the positions of each point to be displayed and determining the data to be displayed at that point slows the operation of the system to a point where operations such as animation are essentially impossible. For this reason, various systems utilizing hardware to speed the operation have been suggested. One method for speeding the operation is to use two output frame buffers, and load one buffer while the other is being scanned to the display. Such a system significantly speeds the operation but requires essentially twice as much memory to accomplish the storage.

It is, therefore, an object of the present invention to speed the operation of computer systems.

It is another object of the present invention to provide circuitry for decomposing a graphic object into portions which may be rapidly processed and scanned into a display buffer so that graphic figures may be generated by the use of quadrilateral subportions.

It is an additional object of the present invention to provide circuitry for processing and scanning graphic information into a display register rapidly enough that a single buffer may be utilized for the display of animated programs.

SUMMARY OF THE INVENTION

These and other objects are realized in a new output display system which utilizes a unique philosophy of graphic figure presentation whereby high speed graphics may be realized using only a single output display buffer. In order to allow the use of hardware to implement the rapid presentation of graphics, it has been found that the information presented to the hardware must be of essentially the same nature no matter what the shape is which is to be drawn on the display. The system is based on a definition of a graphical figure (shape) which considers the shape to be composed of a number of subportions each of which are quadrilaterals. Circuitry is provided for rapidly building quadrilateral images by handling only information regarding the four vertices of those quadrilaterals. All of these quadrilaterals may be handled in the same manner by the graphics presentation hardware and recombined on the display to present the desired shape.

The system breaks these quadrilaterals into subportions of pairs of line segments which subtend a trapezoidal area made up of scan lines to be presented on the output display. The X and Y coordinates of the two ends of each scan line in each trapezoid are then determined. The system takes those rectilinear coordinates and translates them into serial scan lines which may be stored in a frame buffer and displayed on an output display.

This invention particularly relates to a circuit which decomposes the quadrilateral figures into subportions which subportions are made up of two line segments of the quadrilateral and the area therebetween having the same Y values. In each case, the area is a trapezoid or a degenerate trapezoid made up of the parallel Y scan lines joining the two line segments which may be conveniently and rapidly scanned into a display buffer.

The circuit of the invention provides an extremely rapid input to a display buffer. It utilizes a hardware implementation of a four-by-four matrix which employs the four Y values of the vertices of each quadrilateral and comparisons of the values of those vertices to provide instantaneous readouts of the decomposed subportions so that they may be processed and written to the display buffer.

The implementation requires the plotting in the matrix of only the Y element comparisons and handles all imaginable quadrilaterals with but one exception which must be implemented in software. It optimizes the method by which the line segments connecting the vertices of the quadrilaterals to form the minimum set of aligned trapezoids are determined.

The system is devised to select the optimum manner of decomposing a shape so that the operation proceeds at its most rapid. For example, If a shape to be decomposed lies only partially within a clip window and either partially above or below the clip window, the operation will proceed more rapidly if the portion outside the clip window need not be processed. This may be accomplished if the decomposition may proceed from either the top down or the bottom up.

The decomposition provided by the circuitry of this invention takes place either from the top down or from the bottom up. It may be utilized to draw graphical representations from up to down or in reverse thereby substantially speeding the operation of the system. The operation of the circuitry is independent of the order in which the vertices are entered and handles repeated vertices and other degenerate cases of quadrilaterals so that points, lines, triangles, and quadrilaterals are all handled in the same manner.

These and other objects and features of the invention will become apparent to those skilled in the art by reference to the following detailed description taken together with the several figures of the drawing in which like elements are referred to by like designations throughout the several views.

BRIEF DESCRIPTION OF THE DRAWINGS

FIGS. 4(a)–(e) is a series of drawings useful in illustrating the algorithm implemented by the invention.

NOTATION AND NOMENCLATURE

Figure 1:
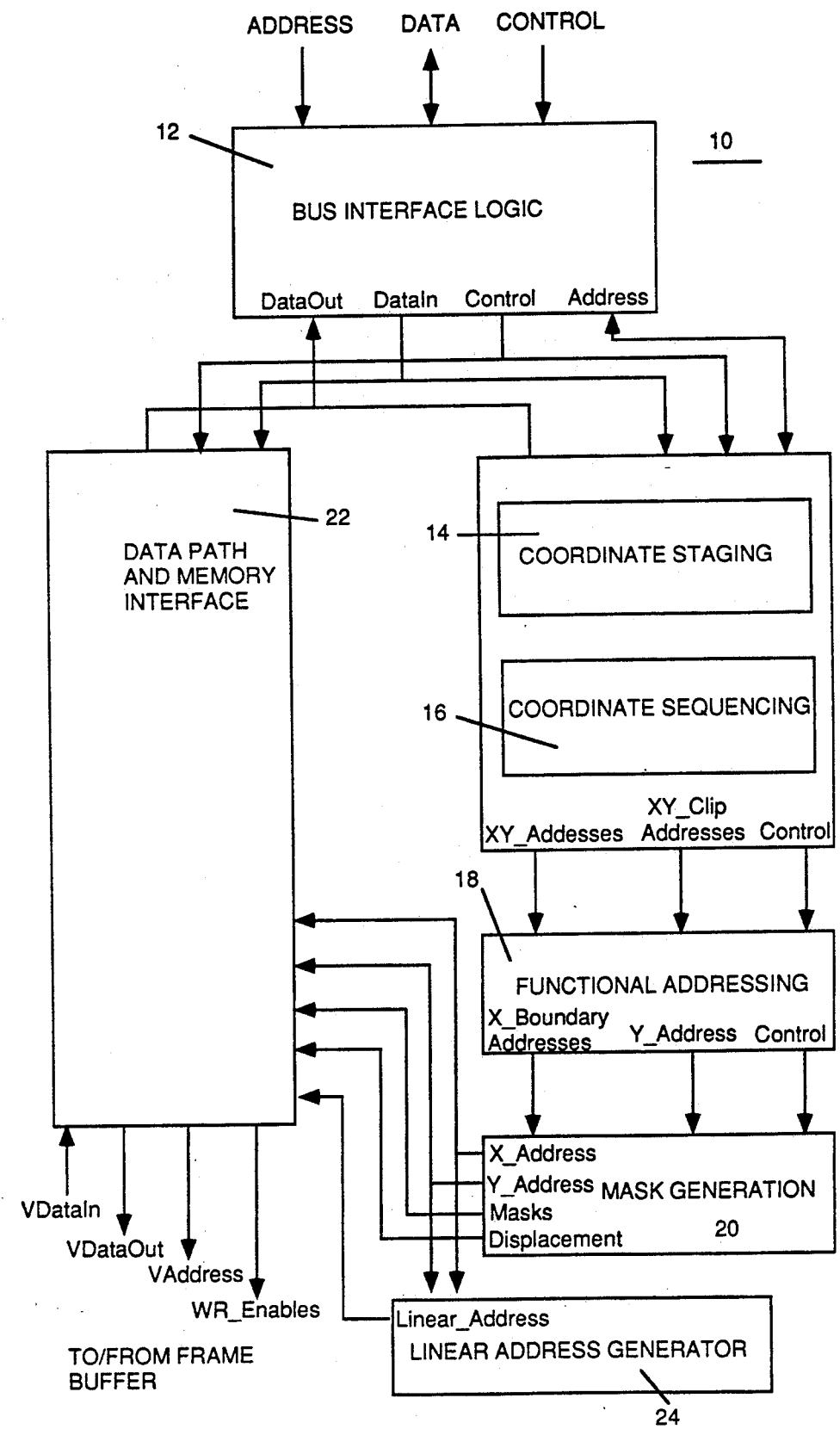
FIG. 1 is a block diagram illustrating a graphical output system for a computer constructed in accordance with the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DESCRIPTION OF THE PREFERRED EMBODIMENT

In designing computer systems, it has become apparent that the display of graphic images substantially slows the operation of most machines. This occurs because the amount of information that the computer must deal with for each frame to be presented on the output display is very large and because the manipulation of that information in order to present the graphics image requires inordinate use of the central processing unit (CPU).

The system of which the invention is a part speeds the presentation of computer graphics by handling most of the operations in hardware so that the information is available instantaneously. In order to allow the use of hardware to implement the presentation of graphics, it has been found that the information presented to the hardware should be of essentially the same nature no matter what shape is to be drawn on the display. This invention is part of a system which is based on breaking the graphics images to be presented into quadrilaterals all of which may be handled in the same manner by the graphics presentation hardware and recombined on the display to present the desired shape. The invention takes these quadrilaterals and further decomposes them into line segments which subtend the same scan lines to be presented on the output display. The invention is capable of treating points, lines, and triangles as degenerate quadrilaterals so that they are handled by the hardware of the system in essentially the same manner as are other quadrilaterals without loss of time or reference to the CPU for special handling.

Figure 2:
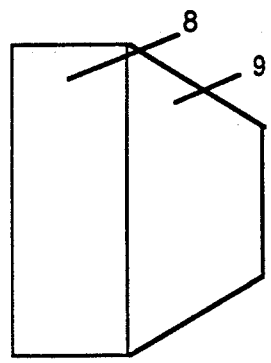
FIG. 2 is an illustration of a shape which may be represented on an output display by a series of quadrilaterals.

FIG. 2 is a representation of a graphical shape divided into two quadrilaterals 8 and 9 which when individually displayed on a computer output device provide the complete original shape. Although the shape shown in FIG. 2 is simple, it will be apparent to those skilled in the art that shapes of essentially infinite complication may be represented if the individual quadrilaterals are chosen to be small enough. In fact, the present invention has been utilized to represent three dimensional animated shapes of a very complicated nature.

FIG. 1 illustrates in block diagram form a graphical output system 10 constructed in accordance with the invention which may be used with a computer system. The system 10 includes bus interface logic 12 which receives information regarding the desired graphical shape from the computer system (not shown in the figures). The bus interface logic 12 receives information on an address line which designates the particular portion of the system 10 to which the input is to be transferred. The bus interface logic 12 receives the actual data such as a color description of a quadrilateral on input data lines. The bus interface logic 12 also receives a control signal designating the manner in which the information is to be treated on a control line.

When constructing graphical representations from quadrilaterals in the present invention, the input information includes the coordinates of the particular clip window in which the information is to appear, the coordinates (vertices) of the quadrilateral, and the color data regarding each quadrilateral. In the preferred embodiment of the invention, a single color is utilized for all pixels of each quadrilateral displayed. The color information which is to be presented at the display of the quadrilateral is stored in a data path and memory interface stage 22. The vertices of the quadrilateral and the clip window information are stored in coordinate staging circuitry 14 which includes hardware that provides comparisons of the incoming information by means well known to the prior art such as registers, magnitude comparators, and gating circuits.

The comparisons made include the comparison of each X value of each vertex to each other X value of each of the other vertices, the comparison of each Y value of each vertex to each other Y value of each of the other vertices, and the comparison of each of these X and Y values of the vertices to the edges of the clip window in which the information is to be presented. Since this is accomplished by hardware, the information is immediately available for use by the system 10 without loss of any system clock time.

The information regarding the vertices of the quadrilateral and the clip window available at the coordinate staging circuitry 14 is presented to a coordinate sequencing stage 16 at which the quadrilateral is decomposed into a series of subportions each of which comprises two line segments of the original quadrilateral. Each of these subportions is such that the line segments define an area of the quadrilateral to be displayed which may be drawn by a series of parallel horizontal scan lines, each defined by an X beginning value and an X ending value such that when all of the scan lines of all of the subparts are rendered on the display, the quadrilateral is defined in total. In essence, the two line segments of each subportion subtend as many Y (horizontal) scan lines as is as possible in view of the shape of the quadrilateral. This has the effect of decomposing the quadrilateral into a minimum set of aligned trapezoids.

Figure 3A:
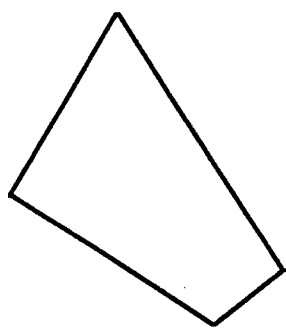
FIGS. 3(a)–(d) illustrates a method of decomposing a quadrilateral into subportions in accordance with the invention.
Figure 3C:
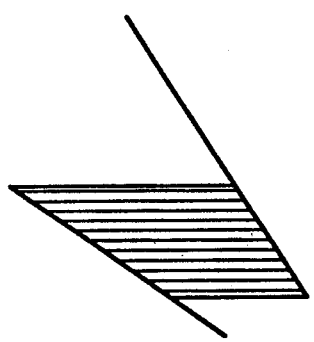
Figure 3B:
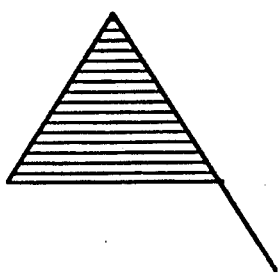
Figure 3D:
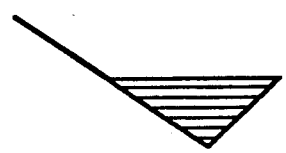

FIGS. 3(a)-(d) illustrates a single quadrilateral divided into subportions in accordance with this invention. The original quadrilateral is that shown in FIG. 3(a) while FIGS. 3(b)-(d) illustrate the three subportions of the original quadrilateral. As may be seen in FIG. 3, each subportion includes between the line segments, when presented on an output display, a series of horizontal scan lines which begin at one line segment defining the quadrilateral and end at another line segment. When these horizontal lines are scanned to the frame buffer for presentation on the output display, the entire quadrilateral shape is reconstituted on the display.

Referring again to FIG. 1, after the quadrilaterals have been decomposed into subportions in accordance with this invention, the individual scan lines have their beginning and ending X values determined at a functional addressing stage 18. In the preferred embodiment of the invention, this is accomplished by the use of circuitry which determines for the two line segments which define the aligned trapedzoid the particular pixels constituting the X values at the beginning and end of each scan line within the decomposed subportions of the quadrilateral. This functional addressing stage 18 also accomplishes a portion of the clipping necessary to fit the particular quadrilaterals to the clip windows in which they are to be displayed, and then transfers the signals to a mask generation stage 20 which arranges the information into sixteen pixel portions that traverse from the beginning to the end of the visible quadrilateral for each scan line and are used for addressing the data path and memory interface stage 22.

The mask generation signals are also furnished to a linear address generator 24 which translates the addresses provided by the mask generation stage 20 into signals for linearly addressing the frame buffer for transfer to the output display. At this point, the color data relating to the quadrilateral to be displayed which has been held in memory at the stage 22 is transferred to the display buffer at the location identified by the linear address generator 24.

Various portions of the system above described are more particularly described in the following patent applications, all of which are assigned to the assignee hereof:

Ser. No. 07/297,475, filed Jan. 13, 1989, HARDWARE IMPLEMENTATION OF CLIPPING AND INTER-COORDINATE COMPARISON LOGIC, Malachowsky and Priem; Ser. No. 07/297,604, filed Jan. 13, 1989, APPARATUS AND METHOD FOR PROCESSING GRAPHICAL INFORMATION TO MINIMIZE PAGE CROSSINGS AND ELIMINATE PROCESSING OF INFORMATION OUTSIDE A PREDETERMINED CLIP, Malachowsky and Priem; Ser. No. 07/297,093, filed Jan. 13, 1989, APPARATUS AND METHOD FOR USING A TEST WINDOW IN A GRAPHICS SUBSYSTEM WHICH INCORPORATE HARDWARE TO PERFORM CLIPPING OF IMAGES, Malachowsky and Priem; Ser. No. 07/297,590, filed Jan. 13, 1989, APPARATUS AND METHOD FOR LOADING COORDINATE REGISTERS FOR USE WITH A GRAPHICS SUBSYSTEM UTILIZING AN INDEX REGISTER, Malachowsky and Priem; Ser. No. 07/287,392, filed Dec. 20, 1988, METHOD AND APPARATUS FOR SORTING LINE SEGMENTS FOR DISPLAY AND MANIPULATION BY A COMPUTER SYSTEM, Malachowsky and Priem; Ser. No. 07/287,493, filed Dec. 20, 1988, METHOD AND APPARATUS FOR TRANSLATING RECTILINEAR INFORMATION INTO SCAN LINE INFORMATION FOR DISPLAY BY A COMPUTER SYSTEM, Malachowsky and Priem; and Ser. No. 07/286,997, filed Dec. 20, 1988, METHOD AND APPARATUS FOR DETERMINING LINE POSITIONS FOR DISPLAY AND MANIPULATION BY A COMPUTER SYSTEM, Malachowsky and Priem.

The invention considered by this specification relates to the apparatus and method of decomposing the quadrilaterals; this apparatus resides in the coordinate sequencing stage 16 in the preferred embodiment of the invention. Although this invention is described in terms of the graphics system illustrated in FIG. 1, it will be realized by those skilled in the art that it will have broad application in other systems for providing graphical output displays for computer systems.

Referring now to FIGS. 4(a)-(c) there are shown a series of three possible quadrilateral shapes each defined by its four vertices and straight lines connecting those vertices. For the purposes of this invention, the quadrilaterals are defined to have vertices x0y0, x1y1, x2y2, and x3y3. In each case, the quadrilateral shape is particularly determined by connecting x0y0 (vertex 0) to x1y1 (vertex 1) to x2y2 (vertex 2) to x3y3 (vertex 3) to x0y0.

For each quadrilateral shape which is to be decomposed so that it may be rapidly processed by the graphics system with which this invention is associated, a four-by-four matrix is presented at this point for explanation purposes. The matrices are actually implemented in hardware as will be explained hereafter. The base of each matrix has its columns labelled as in FIG. 4(a), for example, to indicate the particular vertices of the quadrilateral being defined; column 1 handles information for vertex 1 and so on. Along the left side of the matrix are placed row indications for each vertex. For each vertex, a one is placed in the column for that vertex at the row which indicates the "level" of the vertex. Level as here used is particularly defined to indicate for each vertex the number of other vertices in the particular quadrilateral which have Y values below (or less than) the particular vertex.

For example, in FIG. 4(a), vertex 3 is the lowest vertex and consequently has no other vertices below it. Thus a "one" is placed in row zero of the matrix to indicate the level of this vertex. Vertex 2 has only vertex 3 below it, so a "one" is placed in the matrix at row 1 for vertex 2 to indicate that a single vertex is below it in the quadrilateral shape. In like manner, vertex 0 has two vertices (vertex 2 and vertex 3) below it, so a "one" is written in the matrix at row 2 to indicate level two for vertex 0. Finally, vertex 1 has three vertices below it in the quadrilateral shape, so a "one" is written in the matrix at row 3 to indicate level 3 for vertex 1.

It should be understood that in implementing a matrix in accordance with the invention, a number of rules are followed. For example, each vertex has its own column, and each column may have only a single "one" in it. As will be understood, in order to deal with the matrices for the understanding of the reader of this specification, the columns are considered to repeat to the right and left of the four columns shown in each of FIGS. 4(a)-(c) in the same order, i.e., 0123,0123,0123.

To understand the use of the matrix, the following terms are also used. For each line segment processed, one vertex is called the starting vertex and the other is called the ending vertex. The "current level" is the level of the starting vertex of a line segment. "Ahead" means in the direction of entry to the exemplary matrix, and "behind" means in the direction opposite entry to the matrix. In utilizing the matrix, two lines which make up the selected portion of the quadrilateral which is to be decomposed are considered at the same time. The first line is referred to as line "A" and the second as line "B".

Considering the matrix for the quadrilateral of FIG. 4(a), the matrix is entered from the left in the row which is at the lowest level. The determination of the vertices of what will be the line A begins at that vertex and continues to the right by looking ahead to determine if the vertex in the column ahead lies at a level above the entry vertex. If so, this vertex ahead is selected as the end vertex of the line A. If not, then the determination requires a look behind (to the left) to determine if the vertex in the column behind lies at a level above the entry vertex. If neither of these conditions is true, then the rules require first a look at the column ahead at the same level. If this condition is not true (i.e., no "one" in the column), then the end vertex is set to the column behind. In FIG. 4(a), the entry vertex is vertex 3, and the vertex ahead is vertex 0 which is at a level 2. Thus, the first line segment to be handled is the line running from vertex 3 to vertex 0.

The second or B line is determined by essentially the same rules. The same vertex is the starting point for the second line, but the tests are applied in the opposite direction, i.e., the entry is from the right, the first look ahead is to the left and above, then behind to the right and above, then ahead at the same level, and finally (if none of the forgoing are true) the vertex behind is designated the end vertex of the B line.

It will be seen from FIG. 4(a) that the two line segments connecting vertex 3 with vertices 0 and 2 have a number of the same Y values from vertex 3 all the way up to vertex 2 which define a trapezoid. However, a portion of the line segment defined by the vertices 0 and 3 is not included within this trapezoid. This line segment is, therefore, used again in determining the next pair of line segments. The rule for this selection is to resuse a line segment if its ending vertex level is higher than the ending vertex of the other line segment in the first pair. The other line segment (the B line for this pair) starts with the ending vertex of the line previously used but not repeated. The same rules as to application of the matrix to determine the ending vertices of the line segments pertain, so for FIG. 4(a), the B line of the second pair starts at vertex 2 where a "one" appears at level 1 of the matrix. Looking ahead to the left shows a "one" above level 1 for vertex 1 at level 3, so the line joining vertices 2 and 1 is entered as line B of the second line segment pair which includes the line joining vertices 0 and 3 as the A line segment of the pair. It will be seen that this second pair of lines also includes a number of scan lines at the same Y levels falling between the vertices 2 and 0 and defining a second trapezoidal area.

Finally, the line segment joining the vertices 1 and 2 is reloaded and used as line segment B for the last pair since it has an ending vertex level above the ending vertex level of the line segment joining the vertices 3 and 0. The ending vertex 0 of the A line segment which is not reloaded is used as the starting vertex for the A line segment of the last pair. Looking first ahead from the 2 level of the "one" in the vertex 0 column shows a "one" in the column for vertex 1 and defines the A line segment as the line connecting vertices 0 and 1. This completes the last pair of line segments, and obviously includes all of the remaining scan lines at Y levels within the quadrilateral of FIG. 4(a). The rule for completing the list of line segments requires that the search end if both line segments have terminated at the same level and no higher level exists within the matrix with a "one" in it.

FIG. 4(b) illustrates a second quadrilateral which may be implemented according to the invention. Using the rules referred to above, the matrix is entered from the left at column 0 (representing vertex 0) where a "one" appears at level 0. Looking ahead from this vertex shows a "one" at level 3 for vertex 1 and provides the first or A line segment; entering from the right and looking ahead to the left from this same vertex gives a "one" at level 1 for vertex 3 and provides the B line segment. Since the vertex 1 is above the level of the vertex 3, the line segment including the vertices 0 and 1 is repeated as line segment A of the second pair while line segment B of the second pair begins with vertex 3. Entering the matrix at level 1 for vertex 3 and looking ahead to the left provides a "one" at a higher level at vertex 2; this then is the ending vertex for line segment B of the second pair. Of these two line segments, the line segment with vertices 1 and 0 ends at a level above vertex 2, so this line segment is repeated again as line segment A. Line segment B starts with vertex 2, enters from the right and looks ahead to the left to discover vertex 1 at level 3. The two line segments of this pair having the same vertex and there being no higher vertices, this quadrilateral shape is completed.

The quadrilateral shape shown in FIG. 4(b) demonstrates that the algorithm handles quadrilaterals which begin in different vertex order and that the fact that the quadrilateral is one in which the line segments cross each other has no bearing on the ability of the circuitry to provide the appropriate line segments for the output display.

FIG. 4(c) demonstrates another quadrilateral which may be handled by the invention. In the case of this quadrilateral shape, the quadrilateral has vertices 0 and 1 both at the same Y level so that the line segment joining those vertices is horizontal. Moreover, the shape is, in fact, a degenerate quadrilateral in that vertices 2 and 3 lie on top of one another.

Entering the matrix at level 0 from the left of the matrix, the first "one" encountered is in column 0 representing vertex 0. Looking ahead provides no higher level in column 1 while looking behind provides a "one" at level 2 of column 3. Thus, the first or A line segment is indicated to be the line segment joining vertices 0 and 3. To determine line segment B of the first pair, the matrix is entered from the right and the first "one" encountered is in column 1 representing vertex 1. Looking ahead provides no higher level vertex, while looking behind to the right indicates that vertex 2 completes the B line segment. Since neither ending vertex is above the other, neither segment is repeated; since there is no higher level containing a "one" and both line segments end at the same level, the search is terminated.

It should be noted that the operation demonstrated by FIG. 4(c) uses only the two line segments with the vertices 0,3 and 1,0 in order to scan the quadrilateral completely. That this is sufficient is obvious from looking at the quadrilateral shape of FIG. 4(c); for the line segment joining the vertices 0 and 1 need not be used since it is scanned at the lowest level of the two chosen line segments, and the line segment joining the vertices 2 and 3 has degenerated to a single point.

It is important to the speed of operation of the graphics system of which this invention is a portion that the arrangement of the present invention be able to handle graphical shapes from the top down or from the bottom up. This is important because when a shape is placed in a clip window, some portion of the shape may be beyond the edges of the window and, consequently, not appear on the display. If this portion is above or below the clip window, then defining the shape on the display from above or below eliminates the need for processing information which is not to be displayed and substantially speeds the operation of the system.

The capability of the invention to operate in either an up or a down direction may be demonstrated by simply traversing the matrix of one of the examples given above starting in row 3 and moving toward row 0. The line segments identified in this manner are the same as previously identified and illustrate the ability of the invention to operate in either direction.

There are two conditions which the algorithm used in this invention as described to this point is incapable of handling. The first is the condition in which a horizontal scan line crosses more than two line segments of the quadrilateral. This condition occurs where, for example, the quadrilateral shape shown in FIG. 4(b) is redefined so that vertex 3 is moved up above vertex 2. Such a shape must be handled by the system software. The second condition is one in which a special adaptation of the algorithm is needed.

One condition requiring a special adaptation is that in which the quadrilateral shape is formed by three vertices which lie on the same horizontal scan line and when placed in the matrix of the algorithm the vertex in the center on the same level as two others is either the left or rightmost vertex of the quadrilateral on this level. The shape in such a case is a triangle with one side extending as a horizontal line (see FIG. 4(d)). In such a case, a special horizontal line segment must be defined between the left and rightmost vertices on the multiple vertex level and the vertex for the entry point for line segment A is set as the vertex ahead of the central vertex while the starting vertex for line segment B is set to the vertex behind the exception vertex. In this manner, the portion which has degenerated to a line is ignored once that line has been drawn, and the remaining line segments for both the A and B line segments which follow utilize the remaining vertices in the computations. This is true when the three vertices on the same horizontal line are at the zero level so that the horizontal line extends at the zero level.

If the line extends from the triangle at the "one" level as in the quadrilateral of FIG. 4(e), the stop vertex for line segment A is set to the vertex ahead of the exception vertex, the stop vertex for the B line segment is set to the vertex behind the exception vertex, and a horizontal line is drawn between the right and leftmost vertices at the "one level". This has the same effect of drawing a horizontal line to the exception vertex, and then ignoring this vertex and using the remaining vertices to draw a triangle.

A second special case is one in which the shape is a horizontal line. In this case the operation of the matrix may be optimized by ignoring the normal procedure and setting the line segment A start and end vertex to the leftmost vertex and the line segment B start and end vertex to the rightmost vertex.

A like special case occurs when the quadrilateral shape is a vertical line. The matrix may be optimized by setting the line segment A and B start vertices to the bottommost vertex and the line segment A and B end vertices to the topmost vertex.

Figure 5:
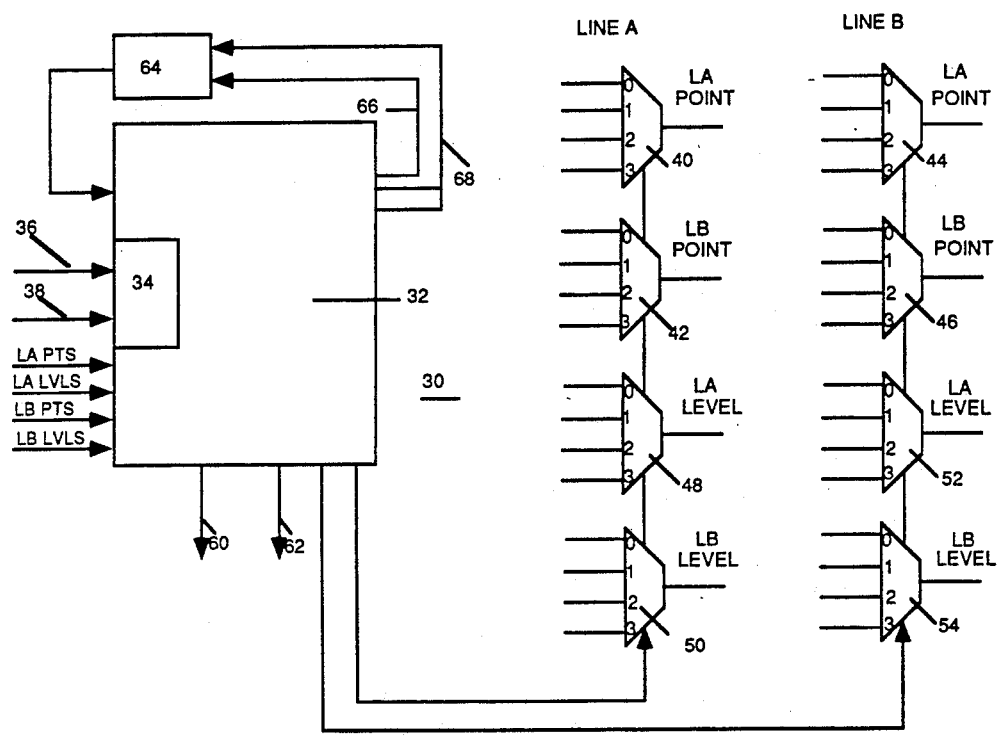
FIG. 5 is a circuit diagram illustrating one arrangement for implementing the invention.

Referring now to FIG. 5 there is shown a schematic block diagram which includes circuitry for implementing the algorithm which has been discussed with respect to FIGS. 4(a)-(c) and the special cases. FIG. 5 illustrates a circuit 30 which is utilized for this purpose. The circuit 30 includes a state machine 32 which controls the entire operation of the circuitry. The state machine 32 includes a portion 34 which receives inputs indicating how the various vertices of the particular quadrilateral of interest compare to one another. These inputs are provided on input lines 36 and 38 each of which carry twelve bits of information in the preferred embodiment and indicate, respectively, X and Y coordinate comparisions. As explained above with respect to FIG. 1, the system of which the preferred embodiment of the invention is a part provides as outputs of the coordinate staging section this information as a by-product of the first step of operation without requiring any additional system clock times.

The state machine 32 provides the signals by which the starting vertex, the ending vertex, and the various special cases referred to above with respect to FIGS. 4(a)-(e) are handled.

The state machine constructs the matrices illustrated in accordance with the following logical equations.

These equations are described in the C programming language for the assistance of those skilled in the art.

---

Definitions

! —binary complement (not)
|| —binary inclusive OR
&& —binary AND
∧ —binary exclusive OR
tlft, trght—top left and top right vertex indication
blft, brght—bottom left and bottom right vertex indication
Yagb means Ya>Yb
Yalb means Ya<Yb
format:
Imat [row][col]

Equations for Building Line Matrix
          Row 0

Imat[0][0]=!(y0g1 || y0g2 || y0g3);
    Imat[0][1]=!(y1g0 || y1g2 || y1g3);
    Imat[0][2]=!(y2g0 || y2g1 || y2g3);
    Imat[0][3]=!(y3g0 || y3g1 || y3g2);
          Row 1

Imat[1][0]=(y110 && ! (y210··y310);
     || (y210 && !(y110 || y310))
     || (y310 && !(y110 || y210));
    Imat[1][1]=(y011 && !(y211 || y311))
     || (y211 && !(y011 || y311))
     || (y311 && !(y011 || y211));
    Imat[1][2]=(y012 && !(y112 || y313))
     || (y112 && !(y012 || y312))
     || (y312 && !(y012 || y112));
    Imat[1][3]=(y013 && !(y113 || y213))
     || (y113 && !(y013 || y213))
     || (y213 && !(y013 || y113));
          Row 2

Imat[2][0]=!(y110∧y210∧y310) && (y110 || y210 || y310));
Imat[2][1]=!(y011∧y211∧y311) && (y011 || y211 || y311));
Imat[2][2]=!(y012∧y212∧y312) && (y012 || y112 || y312));
Imat[2][3]=!(y013∧y213∧y313) && (y013 || y113 || y213));
          Row 3

Imat [3][0]=(y0g1 && y0g2 && y0g3);
    Imat [3][1]=(y1g0 && y1g2 && y1g3);
    Imat [3][2]=(y2g0 && y2g1 && y2g3);
    Imat [3][3]=(y3g0 && y3g1 && y3g2);

Equation to detect Special Case 1a
 —3 points at level 0 with middle one at an extreme pts 30 =
    ((Imat [0][0] && Imat [0][1] && Imat [0][2] &&
    ((x[1]==x[blft]) || (x[1]==x[brght])) &&
    (x[1]!=x[2]) && (x[1]!=x[0]))
    || ((Imat [0][0] && Imat [0][1] && Imat [0][3] &&
    ((x[0]==x[blft]) || (x[0]==x[brght])) &&
    (x[0]!=x[1]) && (x[0]!=x[3]))
    || ((Imat [0][1] && Imat [0][2] && Imat [0][3] &&
    ((x[2]==x[blft]) || (x[2]==x[brght])) &&
    (x[2]!=x[1]) && (x[2]!=x[3]))
    || ((Imat [0][0] && Imat [0][2] && Imat [0][3] &&
    ((x[3]==x[blft]) || (x[3]==x[brght])) &&
    (x[3]!=x[2]) && (x[3]!=x[0]))

Equations to detect Special Case 1b
 —3 points at level 1 with middle one at an extreme pts 31 =
    ((Imat [1][0] && [1][1] && Imat [1][2] &&
    ((x[1]==x[tlft]) || (x[1]==x[trght])) &&
    (x[1]!=x[2] && (x[1]!=x[0]))
    || ((Imat [1][0] && [1][1] && Imat [1][3] &&
    ((x[0]==x[tlft]) || (x[0]==x[trght])) &&
    (x[0]!=x[1] && (x[0]!=x[3]))
    || ((Imat [1][1] && [1][2] && Imat [1][3] &&
    ((x[2]==x[tlft]) || (x[2]==x[trght])) &&
    (x[2]!=x[1] && (x[2]!=x[3]))
    || ((Imat [1][0] && [1][2] && Imat [1][3] &&
    ((x[3]==x[tlft]) || (x[3]==x[trght])) &&
    (x[3]!=x[0] && (x[3]!=x[2]))

---

Portion 34 of the state machine 32 provides as outputs, on thirty-six different lines, signals which are utilized for implementing the algorithm of the invention. These signals include signals each of which indicates the number of one vertex of the quadrilateral of interest and signals which indicate the level value for each vertex. The signals indicating a vertex number are two bit signals in the preferred embodiment. The signals that identify the starting vertex for lines A and B are provided to the multiplexers 40, 42, 48, and 50 of the line segment A multiplexers and to the multiplexers 44, 46, 52, and 54 of the line segment B multiplexers on data select control lines. Multiplexers 40 and 44 are look ahead multiplexers, and as such indicate the column to which the the entry column refers as a look ahead column. Thus, a signal for each column is provided at the input to the multiplexer 40 on the input terminals indicated 0 through 3 (which indicate the entry column). This two bit signal indicates which column is the "look ahead" column for the input column used as an entry column. Since the look ahead column is always the column to the right of the A line segment entry column, the signal provided at the data terminals for a column 0 selection indicates column 1 as the look ahead column and so on, with the signal to column 3 indicating column 0 as the look ahead column. Multiplexer 44 operates in a similar manner except that the "look ahead" column for the B line segment is the column to the left; consequently, the signal on the line for a column 1 selection, for example, indicates the 0 column.

The data inputs to the multiplexers 42 and 46, on the other hand, indicate the "look behind" column for the particular column. Thus, the two bit signal on the column 0 input to multiplexer 42 indicates column 3 is the look behind column, and the signal on the column 3 input indicates that column 2 is the look behind column. Multiplexer 46 operates in a similar manner; but the signal on each column line indicates the column which is one number larger, the "look behind" column for the B line segment.

Two additional multiplexers 48 and 50 are provided for the A line segment, and another two additional multiplexers 52 and 54 for the B line segment. Again, each of these multiplexers has input data lines representing each of the columns 0–3 of the matrix being implemented by the circuitry 30. These input lines carry two bit signals from the circuitry 34 indicating the Y level of each of the columns. For example, using the quadrilateral of FIG. 4(a), line 0 of the look ahead level multiplexer 48 would carry a signal indicating level three because the vertex 1 of column 1, the look ahead column for column 0, has three vertices below it. In like manner, the look ahead level for line 1 of multiplexer 48 carries a signal indicating level one because the vertex of column 2 is at a level with but a single vertex below it. The multiplexer 52 operates in a similar manner (looking to the left, however) to provide look ahead levels indicative of each of the columns for line segment B. In a similar manner, the multiplexers 50 and 54 provide signals indicative of the levels of the vertices at at the "look behind" columns for each of the input lines representing the different columns.

The multiplexers 40, 42, 48, and 50 are activated by signals provided on lines 56 and 58 from the state machine 32 which indicate that either the line segment A or the line segment B is to be defined. Thus, a signal on the line 56 indicating the selected entry column for line A activates the multiplexers 40, 42, 48, and 50 and provides output signal indicating information describing the look ahead column for the particular entry column, the level of that signal, the look behind column for that entry column and the level of that signal. Thus, if the quadrilateral shape of FIG. 4(a) is being decomposed, the entry is at column 3; this entry column signal on the line 56 causes the multiplexers to provide outputs indicating a look ahead column of column 0 with a vertex at level two and a look behind column of column two with a vertex at level one. The information regarding the two vertices that make up the initial A line segment are provided as a four bit output in the preferred embodiment at terminal 60 for transfer to the block 18 shown in FIG. 1 for further manipulation by the system.

In like manner, to determine the initial B line segment for the quadrilateral of FIG. 4(a), a signal is provided on line 58 indicating the entry column for line segment B. This causes the multiplexers 44, 46, 52, and 54 to provide output signals indicating the look ahead and look behind columns and the levels of the vertices at each look ahead and look behind column. The information regarding the two vertices that make up the initial B line segment are provided as a four bit output in the preferred embodiment at terminal 62 for transfer to the block 18 shown in FIG. 1 for further manipulation by the system.

The state machine 32 also includes output lines for providing signals to a comparator 64 which indicate that the operation of decomposition for the particular quadrilateral has been completed. The line 66 provides an indication of the highest level for any of the vertices of the quadrilateral as determined from X and Y input comparison signals. This is used by the comparator 64 and matched with signals on the line 68 which indicate the level of each of the end vertices of the line segments A and B. When the line segments end on equal Y vertices and there are no other levels of vertices above in the quadrilateral, the comparator 64 furnishes a signal to the state register 32 indicating that the quadrilateral has been decomposed and the particular operation is complete.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for selecting the line segments of a quadrilateral graphic figure to be displayed by a computer output display which line segments include points on scan lines common to the line segments comprising means for providing signals indicative of the vertices of a figure to be displayed, means for providing comparisons of the relative positions of such vertices as they are to be displayed, means for selecting a starting vertex for determining the line segments which include points on common scan lines, means for selecting a first line segment connected to the starting vertex, means for selecting a second line segment connected to the starting vertex, and means for providing output signals indicative of line segments selected.

2. A circuit for selecting the line segments of a quadrilateral graphic figure to be displayed by a computer output display which line segments include points on scan lines common to the line segments comprising means for providing signals indicative of the vertices of a figure to be displayed, means for providing comparisons of the relative positions of such vertices as they are to be displayed, means for selecting a starting vertex for determining the line segments which include points on common scan lines, means for selecting a first line segment connected to the starting vertex, means for selecting a second line segment connected to the starting vertex, means for providing output signals indicative of line segments selected, means for determining which of the first or second line segments includes points on scan lines which are not common to the two line segments, and means for generating a third line segment beginning with an ending vertex of the one of the first or second line segments which includes points on scan lines only common to the two line segments.

3. A circuit for selecting the line segments of a quadrilateral graphic figure to be displayed by a computer output display which line segments include points on scan lines common to the line segments comprising means for providing signals indicative of the vertices of a figure to be displayed, means for providing comparisons of the relative positions of such vertices as they are to be displayed, means for selecting a starting vertex for determining the line segments which include points on common scan lines, means for selecting a first line segment connected to the starting vertex, means for selecting a second line segment connected to the starting vertex, means for providing output signals indicative of line segments selected, means for determining which line segment last selected includes points on scan line which are not common to both previously selected line segments, and means for generating an additional line segment beginning with the ending vertex of the one of the line segments last selected which includes only points on scan lines common to both previously selected line segments.

4. A circuit as claimed in claim 3 for selecting the line segments of a graphic figure to be displayed by a computer output display which line segments include points on scan lines common to the line segments further comprising means for determining when a particular figure to be displayed has been completed.

5. A circuit for selecting the line segments of a quadrilateral graphic figure to be displayed by a computer output display which line segments include points on scan lines common to the line segments comprising means for providing signals indicative of the vertices of a figure to be displayed, means for providing comparisons of the relative positions of such vertices as they are to be displayed, means for selecting a starting vertex for determining the line segments which include points on common scan lines, means for selecting a first line segment connected to the starting vertex, means for selecting a second line segment connected to the starting vertex, means for providing output signals indicative of line segments selected, means for determining when more than two vertices of a figure to be displayed lie on the same horizontal scan line and one of such vertices connects to the figure in a manner to define a single line segment extending from the figure, means for providing an output in response to the determination that more than two vertices of figure to be displayed lie on the same horizontal scan line and that one of such vertices connects to the figure in a manner to define a single line segment extending from the figure to provide a signal indicating that a horizontal line segment is to be drawn connecting the extreme vertices, and means for causing the means for selecting a starting vertex to be set to ignore the extreme vertex.

6. A circuit for decomposing quadrilateral figures to be displayed or otherwise utilized by output circuitry of a computer system comprising means for providing information regarding relative levels of vertices of the quadrilateral, means for selecting a beginning vertex which is such that all other vertices lie in the same vertical direction from the beginning vertex, means for selecting two vertices connected by line segments of the quadrilateral to the beginning vertex, means for determining which one of the two vertices connected to the beginning vertex is vertically closer to the beginning vertex, and means for providing output signals defining a trapezoid composed of scan lines lying in an area of the quadrilateral defined by the two line segments between the beginning vertex and a scan line through the vertically-closer vertex for display or other use by the output circuitry.

7. A circuit for decomposing quadrilateral figures to be displayed or otherwise utilized by the output circuitry of a computer system as claimed in claim 6 further comprising means for selecting the vertically-closer vertex as a second starting vertex, means for determining a next vertex connected by a line segment to the vertically-closer vertex, means for determining whether the next vertex or the further of the two vertices connected to the beginning vertex is vertically closer to the beginning vertex, and means for providing output signals defining a second trapezoid composed of scan lines lying in an area of the quadrilateral defined by the portions of the two line segments between the vertically-closer vertex and the next vertically-closer vertex for display or other use by the output circuitry.

8. A circuit for decomposing quadrilateral figures to be displayed or other wise utilized by the output circuitry of a computer system as claimed in claim 7 further comprising means for determining if another vertex exists at a vertical distance from the beginning vertex, and means responsive to the determination of the existence of another vertex for providing output signals defining a third trapezoid composed of scan lines lying in an area of the quadrilateral defined by the portions of the two line segments between the next vertically-closer vertex and such another vertex for display or other use by the output circuitry.

9. A circuit for decomposing quadrilateral figures to be displayed or otherwise utilized by the output circuitry of a computer system as claimed in claim 6 further comprising means for determining that three vertices other than the beginning vertex lie at the same level, and means responsive to such determination for defining a line segment joining at least two of such vertices.

10. A circuit as claimed in claim 6 further comprising means for providing the x-coordinates of the vertices and determining when the all four vertices lie on the same vertical line, and means functioning in response to such determination for disabling normal operation of the circuit and defining a single line segment joining all such vertices.

11. A circuit as claimed in claim 6 further comprising means for determining when the all four vertices lie on the same horizontal line, and means functioning in response to such determination for disabling normal operation of the circuit and defining a single line segment joining all such vertices.

12. A circuit for decomposing quadrilateral figures to be displayed or otherwise utilized by output circuitry of a computer system comprising means for providing information regarding relative levels of vertices of the quadrilateral, means for selecting a beginning vertex for a first line segment which is such that all other vertices lie either at the same vertical level or in the same vertical direction from the beginning vertex, means for selecting a vertex connected by a first line segment of the quadrilateral to the beginning vertex, means for selecting a beginning vertex for a second line segment, means for selecting a vertex connected by the second line segment of the quadrilateral to the beginning vertex of the second line segment, means for determining the one of the two vertices connected to a beginning vertex which is vertically closer to a beginning vertex, and means for providing output signals defining a region composed of scan lines lying in an area of the quadrilateral defined by the two line segments between the beginning vertices and the vertically-closer vertex for display or other use by the output circuitry.

13. A circuit for decomposing quadrilateral figures to be displayed or otherwise utilized by the output circuitry of a computer system as claimed in claim 12 further comprising means for selecting the vertically-closer vertex as a second starting vertex, means for determining a next vertex connected by a line segment to the vertically-closer vertex, means for determining whether the next vertex or the further of the two vertices connected to a beginning vertex is vertically closer to a beginning vertex, and means for providing output signals defining a second trapezoid composed of scan lines lying in an area of the quadrilateral defined by the portions of the two line segments between the vertically-closer vertex and the next vertically-closer vertex for display or other use by the output circuitry.

14. A circuit for decomposing quadrilateral figures to be displayed or otherwise utilized by the output circuitry of a computer system as claimed in claim 13 further comprising means for determining if another vertex exists at a vertical distance from a beginning vertex, and means responsive to the determination of the existence of another vertex for providing output signals defining a third trapezoid composed of scan lines lying in an area of the quadrilateral defined by the portions of the two line segments between the next vertically-closer vertex and such another vertex for display or other use by the output circuitry.

15. A circuit for decomposing quadrilateral figures to be displayed or otherwise utilized by the output circuitry of a computer system as claimed in claim 12 further comprising means for determining that three vertices lie at the same level as a beginning vertex, and means responsive to such determination for defining a line segment joining at least two of such vertices.

16. A circuit as claimed in claim 12 further comprising means for providing the x-coordinates of the vertices and determining when the all four vertices lie on the same vertical line, and means functioning in response to such determination for disabling normal operation of the circuit and defining a single line segment joining all such vertices.

17. A circuit as claimed in claim 12 further comprising means for determining when the all four vertices lie on the same horizontal line, and means functioning in response to such determination for disabling normal operation of the circuit and defining a single line segment joining all such vertices.

* * * * *

UNITED STATES PATENT AND TRADEMARK OFFICE
CERTIFICATE OF CORRECTION

PATENT NO. : 5,020,002
DATED : May 28, 1991
INVENTOR(S) : Malachowsky It is certified that error appears in the above-identified patent and that said Letters Patent is hereby corrected as shown below:

In column 8 at line 11, please delete " resuse " and insert -- reuse --.

In column 12 at line 56, please delete " at " (second occurrence).

Signed and Sealed this

First Day of July, 1997

Attest:

BRUCE LEHMAN

Attesting Officer

Commissioner of Patents and Trademarks